Aug. 12, 1941.     W. C. McCOY     2,252,299
METHOD OF MAKING BUSHINGS
Filed June 14, 1938
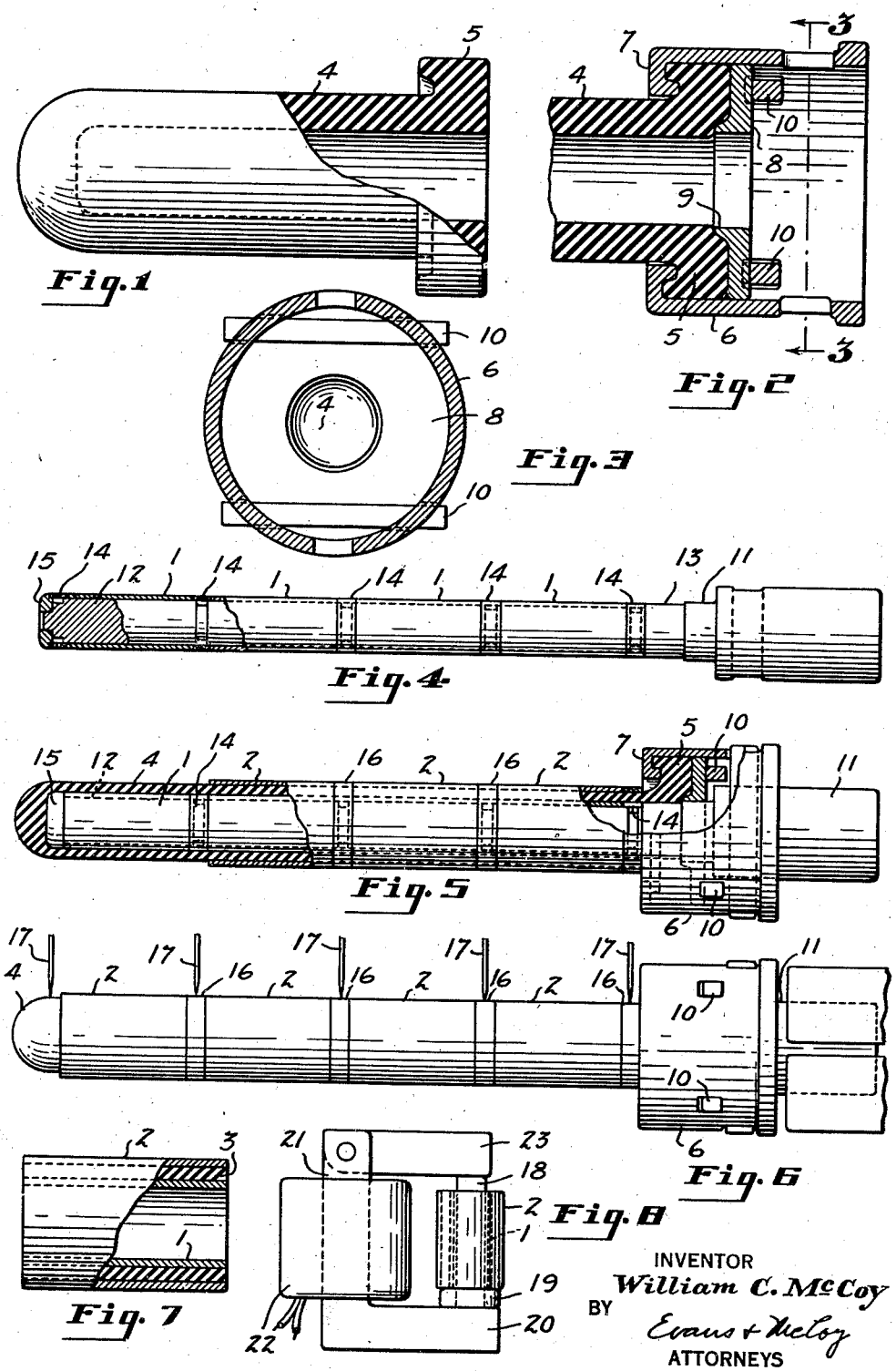
INVENTOR
William C. McCoy
BY Evans + McCoy
ATTORNEYS Patented Aug. 12, 1941

2,252,299

UNITED STATES PATENT OFFICE 2,252,299

METHOD OF MAKING BUSHINGS

William C. McCoy, Shaker Heights, Ohio, assignor to The General Tire & Rubber Company, Akron, Ohio, a corporation of Ohio Application June 14, 1938, Serial No. 213,657

2 Claims. (Cl. 29—88.2)

This invention relates to a method of making resilient bushings of the type in which a cushion of elastic rubber is interposed between relatively rigid inner and outer concentric sleeves.

The present invention has for its object to provide a simple and inexpensive method of making such bushings by which the rubber cushioning sleeve in the completed bushing is under radial compression and firmly secured between the inner and outer sleeves.

A further object is to provide an improved method of affixing the rubber sleeve to inner and outer metal sleeves.

With the above and other objects in view the invention may be said to comprise the method as illustrated in the accompanying drawing hereinafter described and particularly set forth in the appended claims, together with such variations and modifications thereof as will be apparent to one skilled in the art to which the invention appertains. Reference should be had to the accompanying drawing forming a part of this specification, in which:

Figure 1 is a side elevation of an elongated cup-shaped member formed of elastic rubber and adapted to provide the cushioning rubber for a number of bushings;

Fig. 2 is a sectional view of a holder or clamp for the open end of the tubular rubber member;

Fig. 3 is a section taken on the line indicated at 3—3 of Fig. 2;

Fig. 4 is a side elevation of the bushing building mandrel with a series of inner bushng sleeves assembled thereon;

Fig. 5 is a view partly in section and partly in side elevation showing the mandrel and assembled inner bushings with one of the cup-shaped rubber members stretched over it and with outer bushing sleeves encircling the stretched rubber tube which covers the inner sleeves on the mandrel.

Fig. 6 is a side elevation of a mandrel with a series of bushings built up thereon;

Fig. 7 is a section through a completed bushing;

Fig. 8 is a side elevation of an induction heater for generating heat in the metal sleeves of a bushing to vulcanize the rubber surfaces contacting the sleeve surfaces so as to form a bond between the rubber and metal.

The article produced by the method of the present invention is a resilient bushing which as shown in Fig. 7 of the drawing consists of an inner rigid sleeve 1, an outer rigid sleeve 2, and an interposed sleeve 3 of elastic rubber filling the annular space between the inner and outer sleeves. Inner and outer sleeves 1 and 2 of the bushing should be concentric and the rubber sleeve should completely fill the annular space between the two sleeves. It is also desirable that a strong bond be provided between the contacting surfaces of the rubber and the inner and outer sleeves.

The present invention aims to effect economies in manufacture by providing a method for quickly and easily assembling a tubular rubber cushion for the inner and outer sleeves of the bushing, and further to provide means for firmly securing the rubber in place between the inner and outer sleeves.

According to the present invention, the rubber which is utilized to space the inner and outer sleeves of the bushing, is made up in the form of an elongated tubular cup-shaped member 4 such as shown in Fig. 1 of the drawing. The tubular cup-shaped member 4 is composed of elastic rubber and is molded and vulcanized to the form shown in Fig. 1. The tubular member 4 has a radial wall thickness considerably greater than the radial depth of the annular space between the inner and outer sleeves of the bushing and is provided at its open end with a bead or flange 5. The flange 5 is adapted to be held by a suitable clamp such as shown in Fig. 2, which comprises a cylindrical sleeve 6 having an inturned flange 7 at its inner end which surrounds a central opening of a size to receive the body portion of the member 4. The bead or flange 5 of the rubber member is of a size to slidably fit in the clamp sleeve 6 and to provide a shoulder for engagement with the flange 7 of the clamping member. The bead or flange 5 is clamped against the flange 7 of the clamp by means of a metal disk 8 which has a sliding fit within the sleeve 6 and which has a flange 9 surrounding a central opening corresponding in diameter with the internal diameter of the cover member 4. By exerting pressure on the disk 8 the rubber flange 5 is compressed against the seating flange 7 and may be held securely clamped against the flange 7 by means of locking pins 10 extending through spaced openings in the sleeve 6.

For building the bushings a mandrel 11 is provided which has an elongated reduced end portion 12 of a diameter to fit within an inner bushing sleeve 1 and of a length to receive a series of such sleeves. At the inner end of the reduced portion 12, the mandrel has a shoulder 13 which corresponds in diameter to the external diameter of a sleeve 1. The portion 12 of the mandrel is of a length to receive a series of sleeves 1 which are placed upon the mandrel with spacer rings 14 placed between successive bushing sleeves between the innermost sleeve 1 on the mandrel and the shoulder 13 and between the outermost sleeve 1 and a retaining disk 15 secured to the end of the mandrel. The spacer rings 14 are of an external diameter corresponding to that of the sleeves so that when the sleeves and rings are assembled on the mandrel they provide a smooth cylindrical outer surface.

After the sleeves are assembled on the mandrel, as shown in Fig. 4, the mandrel with sleeves 1 thereon are inserted into the open end of a rubber member 4 secured in the clamping member 6 until the outer end of the mandrel engages the closed end of the tubular member 4, whereupon axial pressure is applied causing the rubber member 4 to be stretched over all of the sleeves 1 on the mandrel, elongating the tubular portion of the rubber member to several times its original length and reducing its wall thickness correspondingly as shown in Fig. 5 of the drawing. When so elongated, the exterior diameter of the tubular member 4 is reduced to slightly less than the interior diameter of the outer sleeves 2 of the bushings and a series of these outer sleeves 2 may be mounted upon the exterior of the rubber member 4 directly over the sleeves 1 on the mandrel 11. The sleeves 2 are spaced on the mandrel by means of spacer rings 16 of the same width as the spacer rings 14. The spacer rings 14 and 16 are formed of material which can be readily cut, such as wood or fibrous material, and after the sleeves 1 and 2 and the intermediate tube of rubber have been assembled upon the mandrel the rubber tube may be severed adjacent each end of each of the sleeves. The tubular rubber member 4 is severed adjacent each end of the superposed sleeves on the mandrel by cutting through the spacer disks 16 and 14 and the rubber tube. Any suitable cutting tool may be employed and the cut may be made simultaneously by placing the mandrel in a lathe chuck and engaging the spacer disks with suitable cutting tools. When the rubber tubing is severed the axial tension is released and each section of tubing tends to spring back to its original form contracting axially and expanding radially between the inner and outer metal sleeves. The spacing of the metal sleeves permits only a slight radial expansion so that the rubber tube is securely held between the metal sleeves of each bushing under radial compression.

It is preferred to provide a bond between the contacting surfaces of the inner and outer sleeves of the bushing and the intermediate rubber tube. In order to provide such a bond the tubular rubber member 4 may be coated interiorly and exteriorly with a rubber cement. In order to reduce the adhesiveness of the cement coating and facilitate the assembly of the rubber tube with the metal sleeves on the mandrel, the cemented surfaces are preferably dusted with one of the dusting powders commonly used in rubber factories for facilitating the handling of uncured or cemented rubber articles. Zinc stearate powder is preferred because of the fact that it is absorbed by the rubber upon application of heat. The rubber cement provides a thin layer of uncured rubber in contact with the inner and outer metal sleeves 1 and 2 and a firm bond between the rubber and metal is provided by applying heat to the metal sleeves to vulcanize the rubber surfaces contacting with the sleeves. It is desirable that the heat be applied in such manner that the heat is confined mainly to the unvulcanized surface portions of the rubber tube. This may be accomplished by inducing currents of electricity to the metal sleeves which generates heat in the two sleeves which is communicated to the rubber surfaces contacting therewith and quickly cures the rubber contacting with the sleeves.

A simple form of heater is shown in Fig. 8 of the drawing in which a post 18 forming part of a transformer core is provided of a size to receive an assembled bushing. At the base of the post 18 the core is provided with a seat 19 to support the bushing. The core has a base portion 20 and a post 21 which forms the core of a coil 22 which receives alternating current from a suitable source. An upper core arm 23 is pivoted to the post 21 and is adapted to be swung down in contact with the upper end of the post 18 after a bushing has been placed on the seat 19. Alternating current in the coil 22 creates magnetic fluctuations in the core which induces currents of high amperage in the sleeves 1 and 2 of the bushing, causing these sleeves to be quickly heated to vulcanize the rubber in contact with the metal.

The present invention provides a simple and economical method of assembling the metal and rubber sleeves of a resilient bushing, the method requiring no machinery other than tools and devices which are of simple construction and inexpensive.

Furthermore, it is to be understood that the particular form of apparatus shown and described, and the particular procedure set forth, are presented for purposes of explanation and illustration and that various modifications of said apparatus and procedure can be made without departing from my invention as defined in the appended claims.

What I claim is:

1. The process of making resilient bushings which comprises placing upon a mandrel a plurality of metal sleeves with spacer rings between them, inserting an end of the mandrel into the open end of an elongated cup-shaped tubular elastic rubber member, engaging the inserted end of the mandrel with the closed end of the tube and exerting a pull on the open end of the tubular rubber member to stretch said member over the sleeves on said mandrel, slipping outer sleeves which have an internal diameter slightly greater than the external diameter of the stretched rubber member over the closed end of the rubber member on the mandrel and positioning the outer sleeves over the inner sleeves, and severing the portions of the tubular rubber member interposed between inner and outer sleeves, whereby the severed tubes of rubber contract axially and expand radially within the annular spaces between the inner and outer sleeves.

2. The process of making resilient bushings which comprises placing upon a mandrel a plurality of metal sleeves with spacer rings between them, forming an elongated tubular cup-shaped elastic rubber member, coating said member interiorly and exteriorly with rubber cement, dusting the cement coated surfaces to reduce the adhesiveness thereof, inserting an end of the mandrel into the open end of the said tubular rubber member, engaging the inserted end of the mandrel with the closed end of the tubular rubber member and exerting a pull on the open end of the tubular rubber member to stretch said member over the sleeves on said mandrel, slipping outer sleeves which have an internal diameter slightly greater than the external diameter of the stretched rubber member over the closed end of the rubber member on the mandrel and positioning the outer sleeves over the inner sleeves, severing the portions of the tubular rubber member interposed between inner and outer sleeves whereby the severed portions contract axially and expand radially in the annular spaces between the sleeves, and applying heat to the metal sleeves to vulcanize the rubber surfaces contacting therewith.

WILLIAM C. McCOY.